No. 852,311. PATENTED APR. 30, 1907.
C. A. ARBEY.
PROGRESSIVE BRAKE AND CLUTCH.
APPLICATION FILED NOV. 22, 1904.
3 SHEETS—SHEET 1.
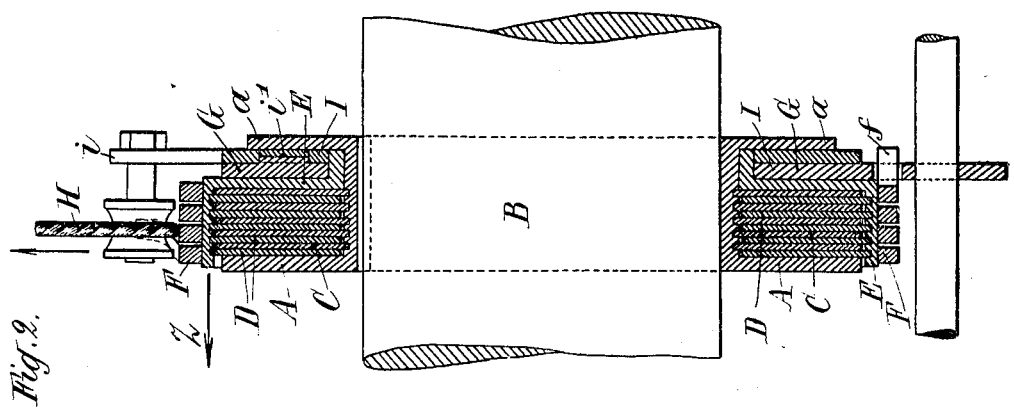
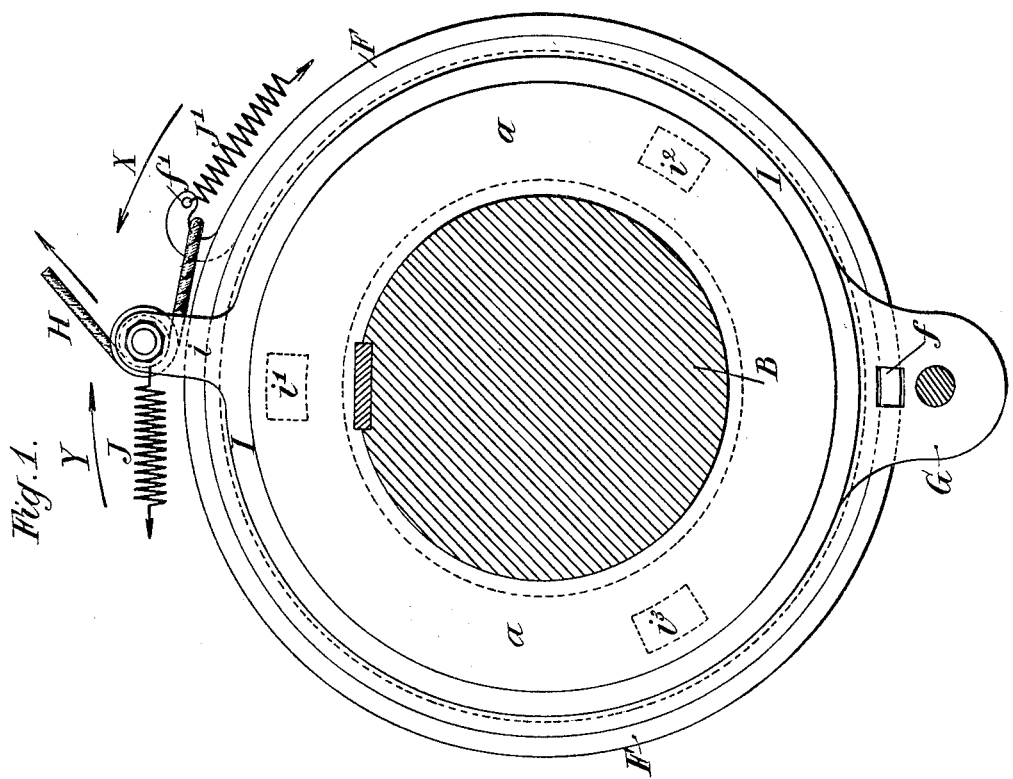
WITNESSES:
F. W. Wright.
M. H. Woodruff.
INVENTOR
Charles Alphonse Arbey
BY
Howson and Howson
HIS ATTORNEYS.

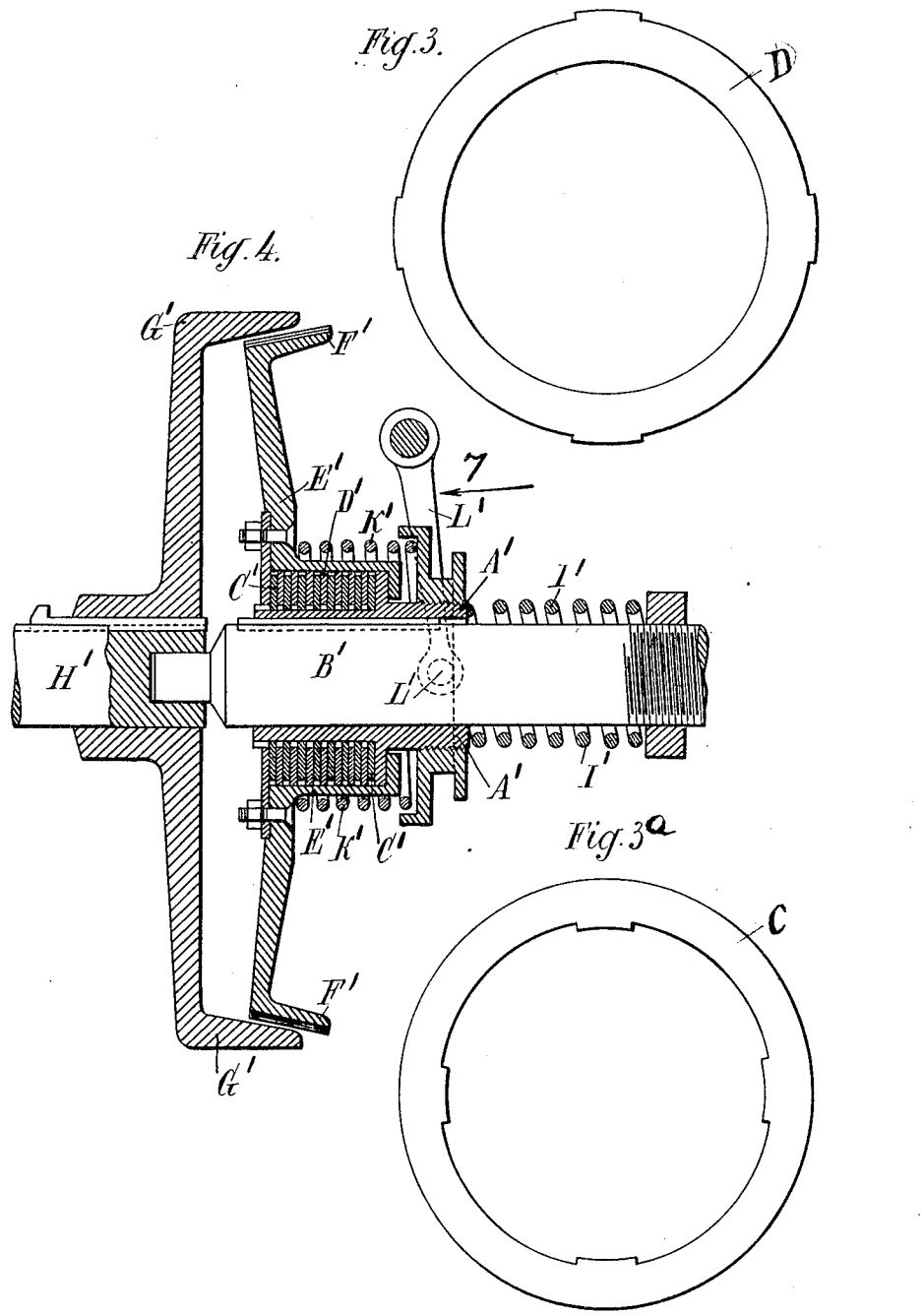

No. 852,311. PATENTED APR. 30, 1907.
C. A. ARBEY.
PROGRESSIVE BRAKE AND CLUTCH.
APPLICATION FILED NOV. 22, 1904.
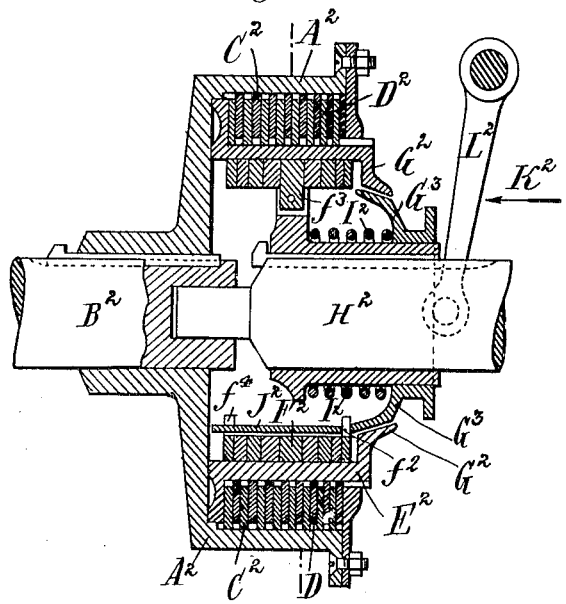
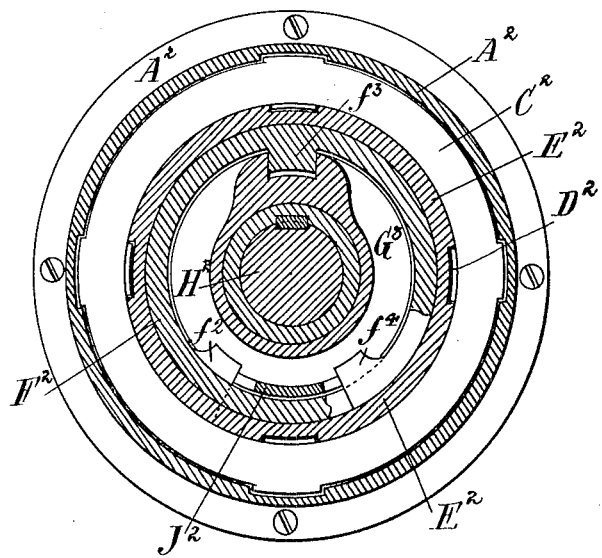

UNITED STATES PATENT OFFICE.

CHARLES ALPHONSE ARBEY, OF BESANÇON, FRANCE.

PROGRESSIVE BRAKE AND CLUTCH.

No. 852,311.      Specification of Letters Patent.      Patented April 30, 1907.

Application filed November 22, 1904. Serial No. 233,858.

*To all whom it may concern:*

Be it known that I, CHARLES ALPHONSE ARBEY, a citizen of the Republic of France, residing in Besançon, Doubs, 38 Rue Charles Nodier, France, have invented certain Improvements in Progressive Brakes and Clutches, of which the following is a specification.

This invention has for its object a progressive brake, characterized by the combination of a multiple disk brake with another brake of any suitable kind, the said system also being equally applicable for use as a progressive clutch.

It is known that multiple disk brakes consist broadly of one or two alternated series of disks or plates applied one against the other; the disks of one series being solid with the part to be braked, such as a shaft, wheel or the like, and the disks of the other series being solid with a fixed part. If the disks are pressed together by an appropriate means, those solid with the shaft or the like to be braked in their rotation rub against those which are solid with the fixed part, this resulting in retarding or stopping the shaft in movement. The multiple disk brake thus constituted presents a certain defect which results from the fact that normally it is practically impossible to obviate all contact of the disks one with the other, which gives rise to an extremely detrimental permanent resistance. This defect is not present in the brake which forms the subject of this invention and which is essentially characterized by the fact that when the brake is released, all the disks rotate together in one piece, the series of disks which is intended to be fixed being locked only during the braking operation. As will be hereinafter explained, this locking is effected, in the arrangements described by way of example, by means of a second spiral or cone brake; it might, however, be effected by the employment of any other method of braking or wedging known, provided that it is sufficiently powerful. In the employment of the device as a clutch, the second brake serves to fix one of the two series of disks to the driving or driven shaft.

The accompanying drawing shows a brake in accordance with the invention and also two forms of clutch produced by the same means as those employed or described herein for the brake.

Figures 1 and 2 represent a form of brake obtained by the combination of multiple disks with the form of brake which is termed either a helical or spiral winding brake; Fig. 1 being an elevation in section at right angles to the shaft to be braked, and Fig. 2 a diametral section. Figs. 3 and $3^a$ represent specimen disks of each of the two series. Fig. 4 shows a form of clutch obtained by the combination of the multiple disks with a cone arrangement. Figs. 5 and 6 represent a form of clutch obtained by the combination of multiple disks with a spiral brake acting by extension. Fig. 5 is a diametral section through this arrangement. Fig. 6 is an elevation partly in section, at right angles to the shaft to be braked.

The brake represented in Figs. 1 and 2 comprises broadly a part A fixed to the shaft B, such as a fly wheel, shaft or the like which it is desired to brake and a series of disks C solid with this part A. Another series D of disks interposed between the foregoing are rigid with a free part E upon which a spiral brake acts. These disks C and D are fitted to their respective supports A and E by notches or mortises, in such a manner as to be capable of displacement parallel with themselves, that is to say in the longitudinal direction of the shaft.

The part E forms a drum upon which is placed the connection F of a spiral brake, the extremity $f$ of which is connected to a part G fixed to a suitable part of the framework of the engine; the extremity $f'$ is connected to an operating member H of any suitable kind. A part I situated between a flange $a$ of the part A and the fixed part G serves by means of its extremity $i$ as point of attachment or guide for the connection or operating part H. At various points on this part I are provided inclined surfaces $i'$, $i^2$ $i^3$ .... serving to engage with corresponding inclined surfaces provided on the fixed part G. The operating cable H passes over a guide pulley carried by the part I.

The operation is as follows: Assuming the shaft to be rotating in the direction X. Normally the part H is free, that is to say the spiral brake F is released and the inclined surfaces of the parts G and I are engaged one in the other in such a manner that these parts adjoin or are separated by their minimum interval. The part A and the disks of the series C rotate with the shaft B to which they are connected. The spiral brake being released, the part E and the disks D turn in one piece with the part A and the disks C by reason of the adhesion due to the contact of the disks one with the other. In order to effect braking, it is only necessary to exert a tractive effort upon the part H, this traction taking place simultaneously on the extremity $f'$ of the spiral brake which it tends to displace in the direction X and upon the part E which carries the inclined surfaces, which part tends to move in the direction Y. The action upon the extremity $f'$ of the spiral brake produces its application, the result being to immediately lock the part E and consequently the disks D. The action of the part I upon the part I causes this latter to rotate through a certain angle in the direction Y; now, in this movement, the play of the inclined surfaces $i'$, $i^2$, $i^3$ . . . . of the parts I and G produces the separation of these latter and as one of them rests on the portion $a$ of the part A and the other upon the part E, this latter moves in the direction Z and the disks C and D are pressed together. The disks of the series D being locked by the spiral brake it follows that the disks C in rotating rub against those of the series D, which thus oppose their movement and consequently that of the shaft B which it is desired to brake.

The intensity of the braking is so much the greater according as the effort exerted on the actuating part is larger, that is to say it depends upon the value of the compression of the disks C and D. On the other hand, as the power of the spiral brake increases at the same time as that of the disk brake, since both are acted upon by the same operating part, it is always certain that the spiral brake will resist the displacement of the part E with its series of disks D which are intended to remain fixed during the braking. The release takes place when the actuating member H is no longer acted upon; the disks separate progressively in proportion as the tension of the spiral brake decreases. The release is complete when the connection of this latter brake being released, the part E with its disks D is able to resume its movement of rotation. The locking of the part E may be obtained by means of one of the many known forms of brake, provided that it is sufficiently powerful, and the compression of the disks may itself be obtained either wholly or in part, by numerous means other than the employment of inclines or helixes. Thus a compression spring may be employed and disengaged at the proper moment, or a counterweight, or one of the known centrifugal devices. This latter method of compression would permit in certain applications of constructing a brake the power of which would be so much the greater, according as the speed of rotation of the part to be braked was itself greater.

By compressing the disks in a permanent manner, for example by means of springs, or in any other appropriate manner, an auxiliary brake may be formed which would act with a constant force when one of the two series of disks was immobilized.

The action of compression may be retarded as desired by retarding the displacement of the part I (Fig. 1) by means of an antagonistic spring J or in any other convenient manner. This spring would facilitate the loosening of the disks when the brake is not longer actuated. In combining the disks brake with the double spiral brake, a reversible brake may be obtained, that is to say a brake acting in both directions. It should be noted that the method might be reversed, the two series of brakes being normally locked and one of them being rendered solid with the shaft in movement in order to effect braking. The point which supports the effort of braking, need not be absolutely fixed and its displacement may be utilized for controlling another brake which may or may not be mounted upon the same shaft or upon a shaft solid with the first or not. The nature and the form of the disks may vary as desired; these disks may even be replaced by a series of cones or more or less sinuous surfaces.

The clutch represented in Fig. 4 and which is produced by the combination of disks and a series of cones, consists broadly of a part $A'$, solid with the shaft $B'$ to be driven. This part $A'$ carries a series of disks $C'$ interposed between the disks of another series $D'$ carried by an incasing part $E'$; the disks are connected with the parts which are rigid with them by a mean identical with that employed for the brake, that is to say by means of notches or mortises. The part $E'$ forms externally a cone $F'$ serving to engage with another cone $G'$, solid with the driving shaft $H'$. The part $A'$, although solid with the shaft $B'$, is able to slide in the longitudinal direction of the shaft $B'$. The spring $I'$, which is termed the engaging spring, serves to press the part $A'$ in the direction 7. A spring $K'$, termed the moderating spring, which is less powerful than the spring $I'$, serves to retard the compression of the disks when engagement takes place and to facilitate disengagement of these same disks when they are released. A fork $L'$ serves for effecting the release by nullifying the action of the spring $I'$.

The device operates as follows: Normally when there is no engagement, the driving shaft $H'$ and the cone $G'$ rotate together, and the two series of disks, forming one piece, are at rest, as is also the shaft $B'$. In order to produce engagement, it is only necessary to release the fork $L'$ which takes the action of the spring $I'$. This latter then presses the part $A'$ in the direction 7, and the said part acts upon the part $E'$ by the intermediary of the spring $K'$. The cone $F'$, solid with the part $E'$ comes into engagement with the cone G' which rotates with the shaft H'. It follows that the cone F', the part E' and the disks D' begin to rotate immediately, with the cone G' and the shaft H'. But in rotating, the disks D' drive by friction and progressively the disks C', the part A' and the shaft B'. The power with which the shaft B' is driven by the shaft H' increases in proportion as the spring I' extends, and its compression action on the disks becomes greater. It follows from this that the shaft B' is driven so much the more gradually as the compression of the disks has been slower, that is to say this progressiveness may be regulated at will by means of the fork L'.

The engaging operation described above is in fact a braking of the shaft H', obtained by the means considered relatively to the brake, with this single difference that the shaft B', although it opposes a certain amount of resistance to being driven, does not constitute a fixed point properly so called.

Obviously the above operation might be reversed, and the shaft B' might be the driving shaft, the shaft H' being the one which offers resistance. The braking action may be obtained rapidly or progressively, according to the manner in which the fork L' acts; in any case, all friction between the disks ceases as soon as the cones F' and G' are released. Existing cone clutches may readily be converted into progressive clutches; in order to do so it is only necesssary to replace one of the two cones by a cone provided with the system of disks, as shown in the cone F' of Fig. 4.

The clutch represented in Figs. 5 and 6 is constituted by the combination of the disks with a double helix acting by extension. A series of disks $C^2$ is rigid with the driving shaft $B^2$ by the intermediary of a cylinder $A^2$ solid with the shaft $B^2$. The disks of the other series $D^2$ are solid with an inner cylinder $E^2$, which is normally loose. In this arrangement, the helix $F^2$, constituted by a double winding, is arranged within the cylinder $E^2$ with which it is intended to become solid when engagement takes place. This helix is able to act in both directions; it being connected at its center $f^3$ to the shaft $H^2$. The helix is actuated by means of a cone $G^2$ solid with $E^2$, of another cone $G^3$, loose upon the shaft and of an engaging spring $I^2$. The cone $G^3$ carries a projection or tappet $J^2$, arranged between the noses $f^4$, $f^2$ formed by the extremities of the helix $F^2$. A fork $L^2$ actuated in the direction $K^2$, prevents the cones $G^2$ and $G^3$ from engaging during the period of release. The operation of this device is as follows: Assuming the shaft $B^2$ to be rotating in any direction. The apparatus being disengaged, the disks of both series will rotate together in one piece with the cylinders $A^2$ and $E^2$ and the shaft $B^2$. The double helix $F^2$ is released and does not touch the inner wall of the cylinder $E^2$. This helix, as also the shaft $H^2$ and the cone $G^3$ are stationary and entirely independent of the shaft $B^2$. If the fork $L^2$ is released, consequently releasing the engaging spring $I^2$, this latter will press the cone $G^3$ in the direction to cause it to engage with the cone $G^2$ of the cylinder $E^2$. Now as the cylinder $E^2$ rotates with the shaft $B^2$, it carries with it the cone $G^3$, the tappet $J^2$ of which strikes against one of the noses $f^4$ or $f^2$ in which the helix $F^2$ terminates. This action of the tappet $J^2$ upon the spirals of the helix $F^2$ produces complete adhesion between this latter and the cylinder $E^2$, and this by virtue of a well known phenomenon frequently employed in clutches. As the helix $F^2$ is solid with the shaft $H^2$, it follows that this latter tends to rotate with the cylinder $E^2$ owing to the influence of the helix. Now, as the shaft $H^2$ opposes a certain resistance to movement and as the cylinder $E^2$ is only rendered solid with the cylinder $A^2$ by a relative adherence of the disks one with the other, considerable retardation of the cylinder is produced and slip between the two series of disks takes place; this slip ceases when engagement is complete, that is to say when the spring $I^2$ has caused the longitudinal displacement of the cylinder $E^2$ by the intermediary of the cones. The compression of the disks then attains its maximum and the shaft $H^2$ runs solid with the shaft $B^2$. Disengagement is produced by abolishing the initial cause of the three successive engagements; of the cones, of the helix and of the disks, that is to say the effect of the spring $I^2$ is annulled by means of the fork $L^2$. The cones $G^2$ and $G^3$ abandon all solidarity, and tappet $J^2$ no longer producing any extension of the convolutions of the helix $F^2$, this latter leaves the cylinder $E^2$ which continues to rotate with the whole constituted by the two series of disks and the driving shaft $B^2$. The helix may of course be controlled by any other frictional arrangement or by any means employed for actuating clutches or brakes based upon the employement of the helix only.

In all the arrangements described above, whether it is a question of the employment of the device as a brake or as a clutch, the *vis viva* or inertia are overcome solely by the friction of a certain number of alternated disks or plates which are pressed together, with this essential feature that apart from the operations of braking and engagement, the two series of disks form an assemblage or whole, while at the moment of braking or engagement, one of the two series of disks is connected to the fixed point, in the case of employment as a brake, or to one of the two shafts in the case of use as a clutch, and this by means of a brake clutch, wedging or the like means of any appropriate known kind.

What I claim and desire to secure by Letters Patent of the United States is:—

A rotating shaft and a set of friction disks carried thereby in combination with a member to which the shaft is to be connected up, a part carrying a set of disks alternating with those carried by the shaft, and means to press said disks together, with a friction brake means to clutch said second mentioned disk-carrying part to the member to which the shaft is to be connected up, and one operating means to throw both the brake and the disks into action.

In testimony whereof I have signed my name to this specification, in the presence of two subscribing witnesses.

CHARLES ALPHONSE ARBEY.

Witnesses:
GUSTAVE DUMONT,
ARCHIBALD R. BAKER.